US006896223B2

(12) United States Patent
Fulcher et al.

(10) Patent No.: US 6,896,223 B2
(45) Date of Patent: May 24, 2005

(54) AIRCRAFT WHEEL IMMOBILIZER (75) Inventors: Robert A. Fulcher, Grand Junction, CO (US); Allan E. Beavers, Grand Junction, CO (US)

(73) Assignee: Miti Manufacturing Company, Grand Junction, CO (US)

( * ) Notice: Subject to any disclaimer, the term of this patent is extended or adjusted under 35 U.S.C. 154(b) by 44 days.

(21) Appl. No.: 10/728,581

(22) Filed: Dec. 4, 2003

(65) Prior Publication Data

US 2004/0113015 A1 Jun. 17, 2004

Related U.S. Application Data (60) Provisional application No. 60/431,187, filed on Dec. 4, 2002.

(51) Int. Cl.$^7$ ............................ B64C 25/42; B60R 25/00
(52) U.S. Cl. ............................ 244/111; 70/226; 70/228; 188/32
(58) Field of Search ............................ 244/111; 70/225, 70/226, 228, 259, 260; 188/32

(56) References Cited

U.S. PATENT DOCUMENTS

| | | | |
|---|---|---|---|
| 1,370,364 A | 3/1921 | Rodriquez | |
| 1,376,114 A | 4/1921 | Raney | |
| 2,418,279 A | * 4/1947 | Sax et al. | 188/32 |
| 2,442,501 A | * 6/1948 | Mast et al. | 188/32 |
| 2,822,063 A | * 2/1958 | Hampton | 188/32 |
| RE24,712 E | 10/1959 | Marugg | 70/225 |
| 2,960,857 A | 11/1960 | Winter | 70/19 |
| 3,537,548 A | 11/1970 | Jeppesen | 188/32 |
| 3,581,846 A | 6/1971 | Janus | 188/32 |
| 3,695,071 A | 10/1972 | West | 70/225 |
| 3,760,620 A | 9/1973 | Robles | 70/226 |
| 3,828,590 A | 8/1974 | Thiebault | 70/19 |
| 3,845,643 A | * 11/1974 | Barrett | 70/18 |
| D275,073 S | 8/1984 | Winter | D8/330 |
| 4,649,724 A | 3/1987 | Raine | 70/226 |
| 4,723,426 A | 2/1988 | Beaudoin | 70/14 |
| 4,804,070 A | 2/1989 | Bohler | 188/32 |
| 4,819,462 A | 4/1989 | Apsell | 70/14 |
| 4,833,442 A | 5/1989 | Von Heck | 340/427 |
| 5,040,389 A | 8/1991 | Beaudoin | 70/226 |
| 5,134,868 A | 8/1992 | Bethards | 70/18 |
| 5,263,553 A | 11/1993 | Duncan | 188/32 |
| 5,315,848 A | 5/1994 | Beyer | 70/18 |
| 5,333,477 A | 8/1994 | Davis | 70/226 |
| 5,372,018 A | 12/1994 | Smith | 70/18 |
| 5,375,442 A | 12/1994 | Hammer | 70/226 |
| 5,385,038 A | 1/1995 | Walker | 70/14 |
| 5,427,210 A | 6/1995 | Willaford | 188/32 |
| D385,525 S | 10/1997 | Beavers et al. | D12/217 |
| D385,526 S | 10/1997 | Hinkle | D12/217 |
| 5,689,981 A | 11/1997 | DeLuca et al. | 70/226 |
| 5,865,048 A | 2/1999 | Beavers et al. | 70/18 |
| 6,032,497 A | 3/2000 | Fulcher et al. | 70/19 |
| 6,116,062 A | * 9/2000 | Markegard et al. | 70/19 |
| 6,725,979 B1 | * 4/2004 | Snook | 188/32 |
| 2004/0045774 A1 | * 3/2004 | D'Alessio | 188/4 R |

FOREIGN PATENT DOCUMENTS

| | | |
|---|---|---|
| AT | 227102 | 4/1963 |
| GB | 2112725 | 7/1983 |
| NO | 93730 | 2/1959 |

* cited by examiner

Primary Examiner—J. Woodrow Eldred
(74) Attorney, Agent, or Firm—Sheridan Ross P.C.

(57) ABSTRACT

The present invention is adapted to immobilize a vehicle by utilizing a pair of selectively interconnected chocks that are placed fore and aft of a tire. The chocks are preferably used to secure aircraft from unauthorized motion in airport parking areas.

20 Claims, 8 Drawing Sheets

AIRCRAFT WHEEL IMMOBILIZER

This application claims priority to U.S. Provisional Patent Application Ser. No. 60/431,187, filed Dec. 4, 2002, entitled "Aircraft Wheel Immobilizer," which is incorporated herein in its entirety.

FIELD OF THE INVENTION

The present invention relates to devices for selective interconnection to a tire of a vehicle, and more specifically to light-weight chocks used to prevent theft and unauthorized movement of aircraft.

BACKGROUND OF THE INVENTION

Wheel immobilization devices are employed in a variety of situations, most commonly being the wheel chock. Wheel chocks provide an easy and inexpensive way to ensure that a vehicle will remain at rest if a parking brake should fail. Often chocks will have a triangular or rectangular cross section, the former being the preferred shape because it approximates the shape of a tire and thus provides a greater assurance of immobility. Wheel chocks are frequently used to restrain large trucks, mobile support equipment, or in the case of the present invention, aircraft.

It is common practice at most airports to provide chocks and/or tie-down means at aircraft parking and staging areas to prevent aircraft from rolling due to uneven pavement surfaces or wind impingements. More specifically, chocks prevent horizontal motion, while tie-downs generally prevent vertical motion, for example lift generated by high ground winds. Thus, chocks and tie downs provide sufficient immobilization for small aircraft. Larger aircraft generally do not require tie downs since ground winds have a reduced effect thereon, due to their increased weight. Tie-downs also may be capable of providing sufficient rolling impedance for smaller aircraft if chocks are not available.

After the Sep. 11, 2001 terrorist attacks on the United States, it became painfully evident that America's aircraft and airports are in need of greater security measures. One area that requires more security are airports that serve private pilots and business jets. Even though security has been increased as a result of the terrorist attacks, there are still gaping holes that may allow a terrorist with the proper skills to steal an aircraft and reek havoc. Moreover, many small airports are not completely surrounded by fences or walls, and door locks of many small planes are notoriously easy to circumvent. A would-be terrorist could easily gain access to the aircraft parking area, remove the chocks and tie-down chains, gain access to an aircraft, "hot-wire" the ignition, and take off. Since many single engine aircraft are light weight and have low wing loading, a runway take off may not be necessary, such that a taxiway would suffice to enable the aircraft to become airborne. Thus, an aircraft could be in the air before ground or tower controllers realize that the aircraft had been stolen. Even though one small single-engine aircraft may not do much damage, many coordinated aircraft would do great damage to a building, sports venue, or other structure.

An aircraft may be locked via the tie-down means. Chain or cable tie-downs, which interconnect wing attachment points to the ground, may be integrated with locks in order to prevent unauthorized movement of an aircraft. Unfortunately, many of these types of tie-downs are prone to rust and are easily cut. Alternatively, the attachment hardware on the aircraft could be removed. Finally, many small airports employ rope tie-downs which provide no protection against theft.

Propeller locks are another means of preventing unauthorized use of an aircraft. However, propeller locks may be undesirable to employ because generally they are heavy, cumbersome, difficult to install and remove, and are apt to damage the propeller during installation and removal. In addition, propeller locks only prevent movement of the propeller, the wheels of an aircraft utilizing such a lock may be moved, wherein the aircraft may be stolen. Finally, propeller locks are useless in conjunction with jet aircraft.

The foregoing is mainly concerned small private aircraft, but theft can foreseeably occur with respect to larger aircraft or other types of vehicles, although the sophistication of a thief or terrorist may necessarily be greater. Theft of business or jumbo jets may foreseeably occur, which are capable of causing great damage. Finally, as was the case in the Oklahoma City bombing, trucks have been used in the past as weapons of terror.

Thus, there is a long felt need in the field of wheel immobilization to provide an apparatus that is capable of locking interconnection with a vehicle to prevent theft while ensuring vehicle immobility. More specifically, it has been an urgent need to provide a means to secure parked aircraft so that they do not become potential terrorist weapons. The following disclosure describes a locking chock that is adapted to immobilize an aircraft by selectively interconnecting with a tire thereon.

SUMMARY OF THE INVENTION

It is one aspect of the present invention to provide an apparatus that not only prevents a vehicle from moving, but also is capable of being locked to prevent unauthorized removal thereof. More specifically, in one embodiment of the present invention, a two piece chock system is provided such that one piece is adapted to be inserted in front of an aircraft's tire, while the other is adapted to be interconnected behind. The two pieces are designed for simplistic adjustment, wherein the device may be used for various tire diameters. Once properly placed on the tire, the two interconnected pieces are locked together and preferably tethered to the aircraft to prevent a would-be thief from simply lifting the wheel out of the chock.

It is another aspect of the present invention to provide an apparatus that is cost effective to manufacture, and utilizes common materials. Due to the heightened risk of terrorism, it is envisioned that locking devices as described herein will be encouraged or lawfully required by statute to be used in the near future. Therefore, to make any transition as cost effective as possible, one embodiment of the present invention is designed to be manufactured from common materials. Preferably, the chocks are constructed of aluminum, steel, or any other rigid materials known in the art. Alternatively, the chock may be constructed with formed composite, durable plastic, or polycarbonate materials. By using common materials and machining techniques, the chock halves will also be easy to maintain or repair if damaged.

It is yet another aspect of the present invention to provide an apparatus that is simplistic to use. A locking chock that is difficult to install will inevitably not be employed with great frequency, unless mandated by law. Therefore, in one embodiment of the present invention the locking halves of the chock are light-weight and may be installed by a single person. To ensure an aircraft is properly secured at the termination of a flight, chocks are often carried onboard in the event the airport is not equipped with extra chocks. Heavy chocks will decrease the effective payload of an aircraft, which may be a detriment when flying a smaller aircraft. Light chocks, however, are easy to manipulate into interconnection with a tire, thereby eliminating excuses of tired pilots related to the installation of the device. Moreover, one-person installation is important in the event of a solo flight where no ground personnel are available to aid in securing an aircraft.

It is still yet another aspect of the present invention to provide an apparatus that is adapted for many sizes of aircraft. As previously mentioned, any size of aircraft is capable of being stolen, therefore various sized and shaped locking chocks are required. In one embodiment of the present invention, inclined surfaces are integrated into a chock, wherein it is capable of wedging between the aircraft's tire and the ground. A second, similarly designed chock will then wedged between the tire and the ground opposite of the first and be secured thereto. By interconnecting the two chock halves in a telescoping manner, a plurality of tire diameters are accommodated. The aforementioned inclined surfaces may also be adapted to contract and expand to accommodate a plurality of tire widths. An embodiment employing one or both of these adjustment means will allow airports to have extra sets of chocks to accommodate various types of wheels of incoming aircraft.

It is yet another aspect of the present invention to provide a chock that prevents disengagement by vertical wheel displacement. Some un-chained chocks may be forcibly disengaged from an aircraft by lifting the wheel and sliding the chock away. This method of disengagement is most readily seen in the context of light aircraft, wherein very little upward force is required to provide sufficient clearance for an un-chained chock to be removed. Therefore, one embodiment of the present invention is equipped with vertical extensions that maintain interconnection to the tire when it is displaced vertically. Preferably, curved fenders are provided that conform with a substantial portion of a tire's contour to prevent vertical disengagement. In one embodiment of the present invention, the fenders are hingedly interconnected to the main body of the chock and are capable of folding into the chock body when not in use to facilitate storage.

It is another aspect of the present invention to provide a chock that is adapted to interconnect to an aircraft employing multi-wheel landing gear. Some aircraft employ landing gear with a plurality of wheels interconnected in close proximity via an axle. One embodiment of the present invention is adapted to immobilize at least one of the plurality of wheels, thereby preventing movement or theft of the aircraft.

It is yet another aspect of the present invention to provide a chock that is capable of frictional or separable interconnection with a parking surface in order to mitigate vehicle motion. In one embodiment of the present invention, the bottom surface of the chock is equipped with a non-skid material. Preferably, rubber soles or abrasive material, as sometimes used on stairways, may be interconnected to the bottom surface of a chock to create a friction-based bond with the parking area. An embodiment with fenders, as described above, may also employ small deformable protrusions that are adapted to interface between the tire and the parking surface, thereby more securely restraining the wheel and providing added impedance to movement. Alternatively, the chock may be constructed with apertures which are capable of receiving ground tie-down means or spikes. Further, one embodiment of the present invention includes a stationary portion of the chock that is interconnected to the parking area, wherein another, mobile portion, is capable of selective interconnection to the stationary portion when a wheel is in place, thereby completely immobilizing the vehicle.

It is still yet another aspect of the present invention to provide an apparatus that is adapted to be employed on other vehicles besides aircraft. Although the foregoing has mostly been concerned locking chocks capable of being used with aircraft, one skilled in the art will appreciate that other vehicles may employ the present invention. Trucks may more easily be used as terrorist tools than aircraft. Thus, it is imperative that ground vehicles are also secured against such a threat. Also, when being ferried on an ocean going vessel, across undulating waters, it is desirable to chock the wheels of any type of motor vehicle to prevent motion. Thus, the employment of a chock that secures an automobile during any kind of transport is a benefit.

Thus, it is one aspect of the present invention to provide a vehicle immobilization apparatus comprising:

a forward chock comprising a left channel, a right channel, and a tire contact surface, interconnected to said left channel and said right channel;

a rear chock comprising a left channel, a right channel, and a tire contact surface, interconnected to said left channel and said right channel;

wherein a tire of the vehicle is substantially immobilized when said left channel of said forward chock is selectively interconnected to said left channel of said rear chock, said right channel of said forward chock is selectively interconnected to said right channel of said rear chock, and said tire contact surface of said forward chock and said tire contact surface of said rear chock are engaged on the tire; and a locking means interconnected to at least one of said left channel of said forward chock, said left channel of said rear chock, said right channel of said forward chock, and said right channel of said rear chock, which restrains said forward chock with respect to said rear chock when they are selectively interconnected, thus preventing removal of said apparatus.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these embodiments.

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

To assist in the understanding of the present invention the following list of components and associated numbering found in the drawings is provided herein:

| # | Component |
|---|---|
| 10 | Locking Chock |
| 20 | Forward Chock |
| 30 | Rear Chock |
| 34 | Ramp |
| 35 | Inverted Ramp |
| 36 | Large Diameter Tire |
| 38 | Small Diameter Tire |
| 40 | Wheel hub |
| 41 | Channel apertures |
| 42 | Lock |
| 46 | Chain |
| 50 | Strut |
| 55 | Side locking "C" Channel |
| 57 | Plate |
| 60 | Vertical extensions |
| 64 | Handle |
| 66 | Fender |
| 67 | Rod |
| 68 | Back rest |
| 74 | Axle |

DETAILED DESCRIPTION

Referring now to FIGS. 1 through 12, a locking chock of the present invention is shown herein. More specifically, a wheel immobilization device 10 that is commonly employed on aircraft, is shown that consists of at least a forward chock 20, a rear chock 30, a lock 42, and a flexible securing mechanism, such as a chain 46. Once the aircraft is parked, a pilot or airport ground personnel, slide the forward chock 20 of the chock in front of a tire 36 on the aircraft. Next, the rear chock 30 is slid behind the tire 36 and selectively interconnected to the forward chock 20.

Referring now to FIGS. 1 through 7, one embodiment of the present invention is shown herein. More specifically, a locking chock 10 that includes a forward chock 20 and a rear chock 30 that are adapted for selective interconnection is shown. Preferably, the half chocks 20 and 30 each include two opposing "C" channels interconnected by a ramp 34 that is adapted to interface with an aircraft tire 36. The ramp 34 is adapted to fit the contour of the tire 36 such that it will be prevented from rolling. In addition, the ramp 34 is designed to fit different sized tires to prohibit movement. For example, a ramp 34 may be fashioned to restrain a 17 inch diameter tire 36 or a 13 inch diameter tire 38 that yields sufficient immobility in both situations. Furthermore, the ramp 34 is approximately the same width W as the tire to which it is adapted to be used. However, one skilled in the art will appreciate that the ramp 34 may be made adjustable in order to accommodate a plurality of tire widths. For example, the ramp may be made of at least two halves that are operably interconnected and thus adjustable.

Referring now to FIGS. 3–7, the "C" channels (hereinafter "channels") of the locking chock is further described herein. The channels are designed to selectively interconnect by a telescoping connection. In one embodiment, the forward chock 20 has an overall height of $H_o$, which is such that there is no interference between the chock and an aircraft's wheel hub 40 or any protruding aircraft mechanisms. The forward chock 20 has a inner-channel height of $H_m$, which is substantially the same as the rear channel's 30 overall height. Therefore, the channel employed on one chock half is capable of a sliding, telescoping, interconnection with the channel on the other chock half. The channels are also equipped with a plurality of apertures 41 and/or slots that are adapted to receive a lock 42. The forward 20 and rear 30 chocks of the locking chock 10 may be constructed from any rigid material, preferably aluminum, stainless steel, or a graphite impregnated composite.

Figure 1:
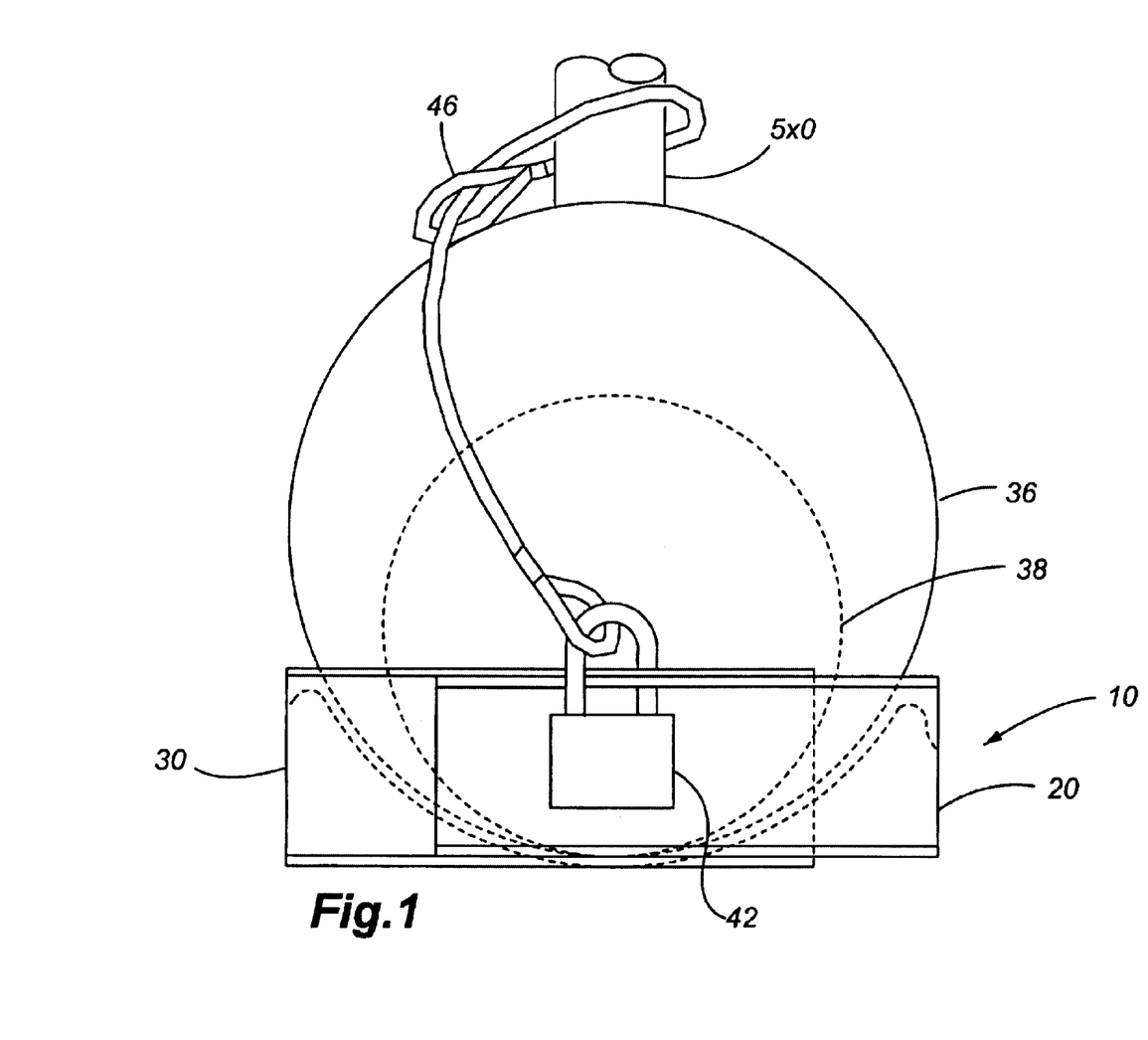
FIG. 1 is a front elevation view of one embodiment of the present invention, wherein only one side of the selectively interconnecting chock halves are locked and chained.
Figure 2:
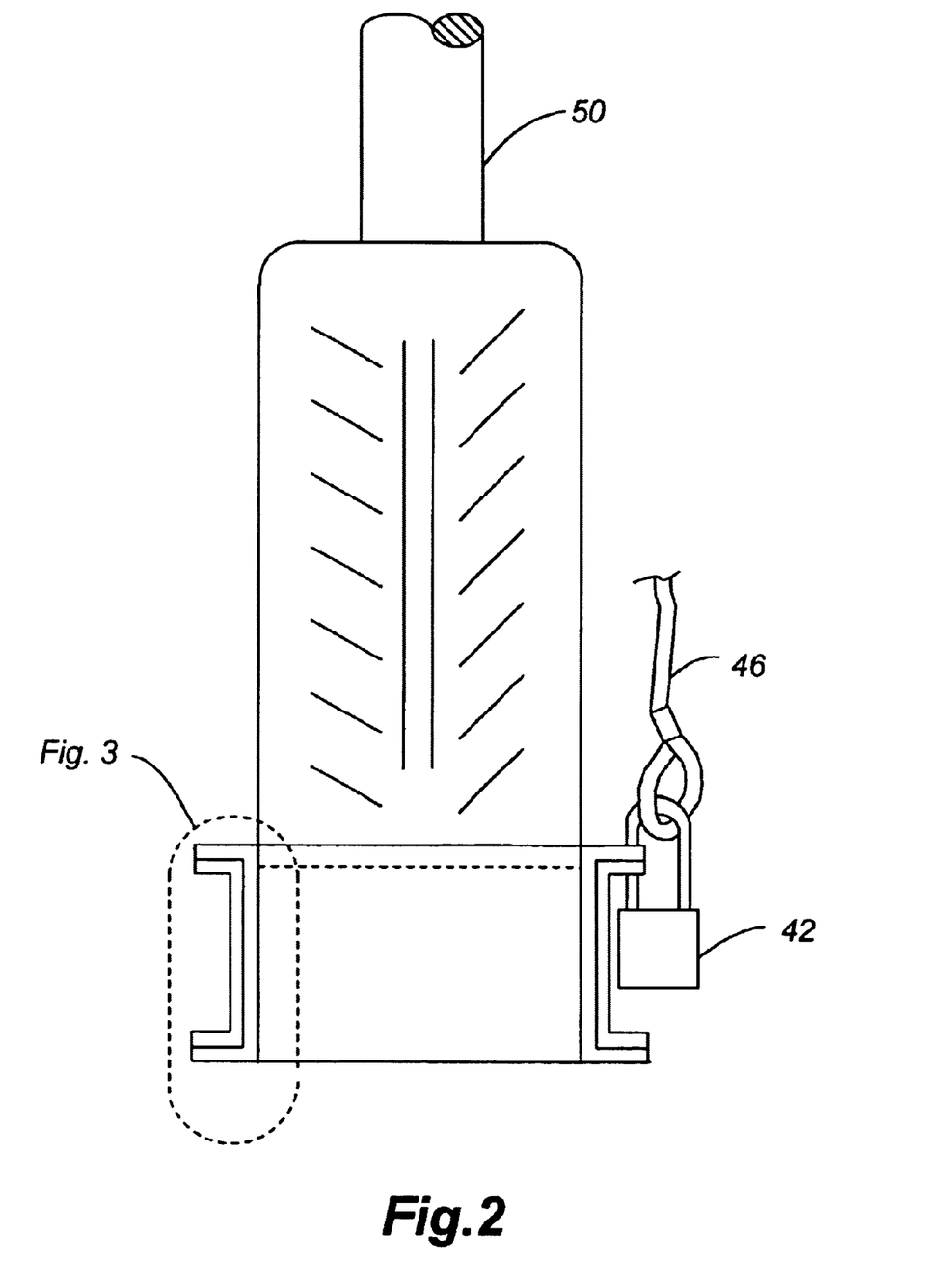
FIG. 2 is a left elevation view of the embodiment of the present invention shown in FIG. 1.
Figure 3:
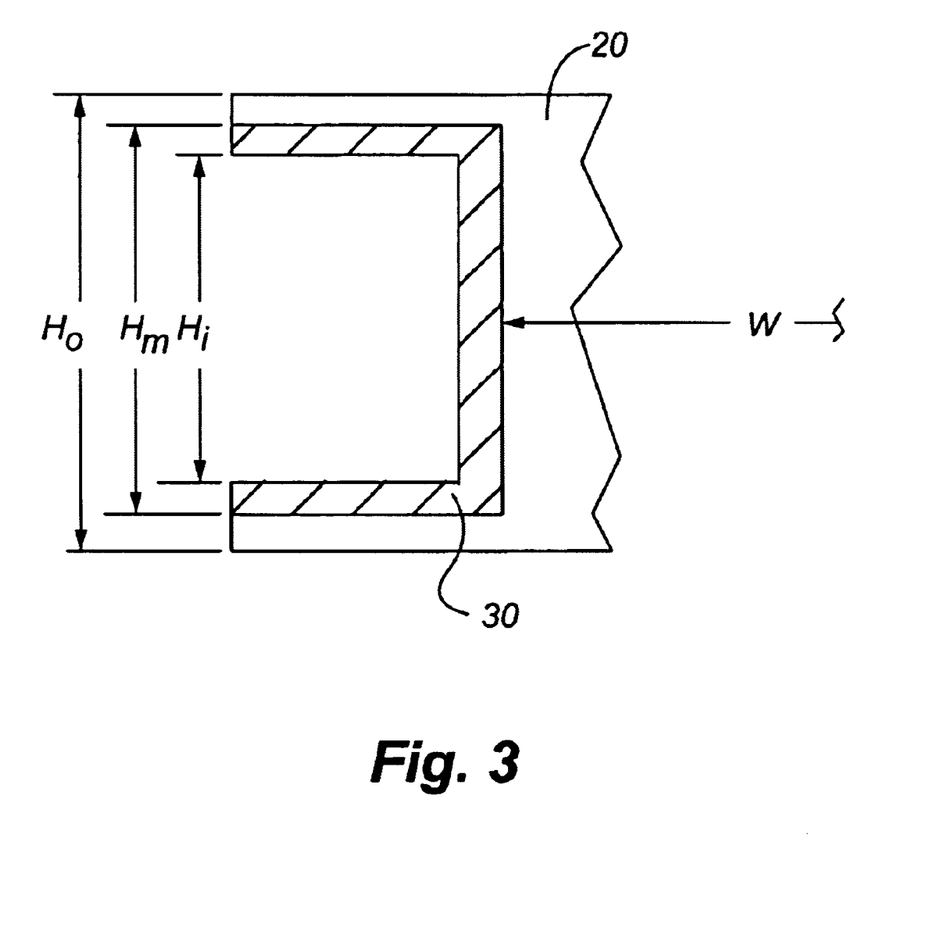
FIG. 3 is a detail view of the embodiment of the present invention shown in FIG.2; wherein the interconnected chocks are shown.
Figure 4:
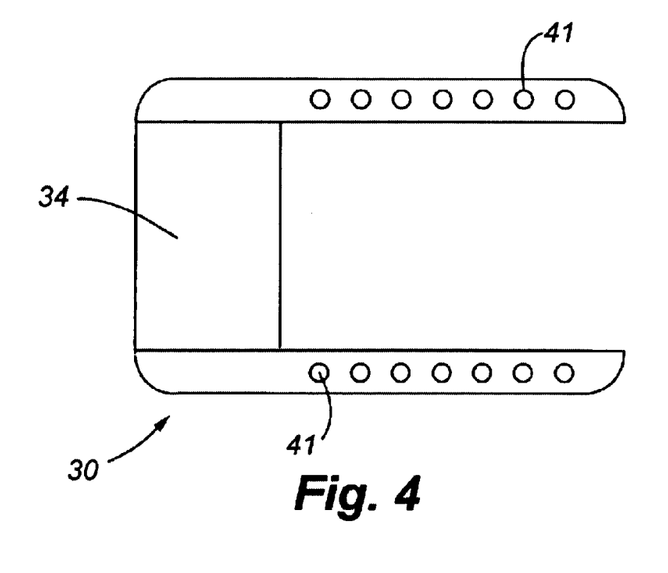
FIG. 4 is a top plan view of a first chock half of the present invention shown in FIG. 1.
Figure 5:
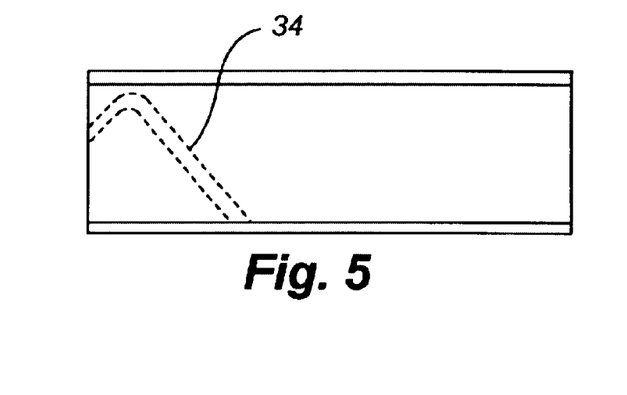
FIG. 5 is a front elevation view of the first chock half of the present invention shown in FIG. 4.
Figure 6:
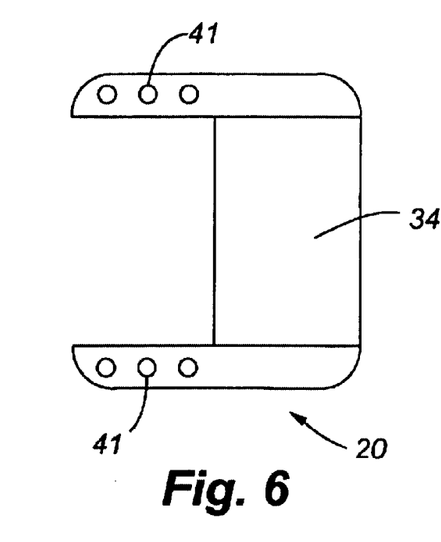
FIG. 6 is a top plan view of a second chock half of the present invention shown in FIG. 1.
Figure 7:
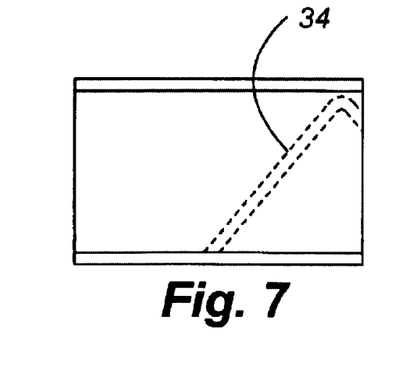
FIG. 7 is a front elevation view of the second chock half of the present invention shown in FIG. 6.
Figure 8:
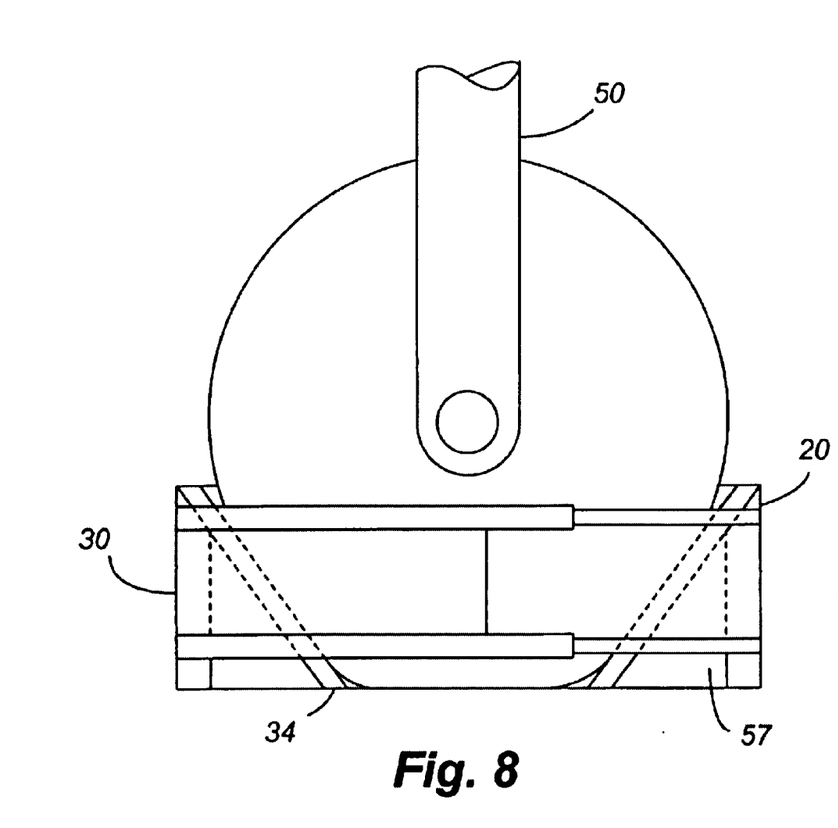
FIG. 8 is a front elevation view of another embodiment of the present invention, wherein a single telescoping "C" channel is employed to selectively interconnect the chock halves; and wherein a locking means is omitted for clarity.
Figure 9:
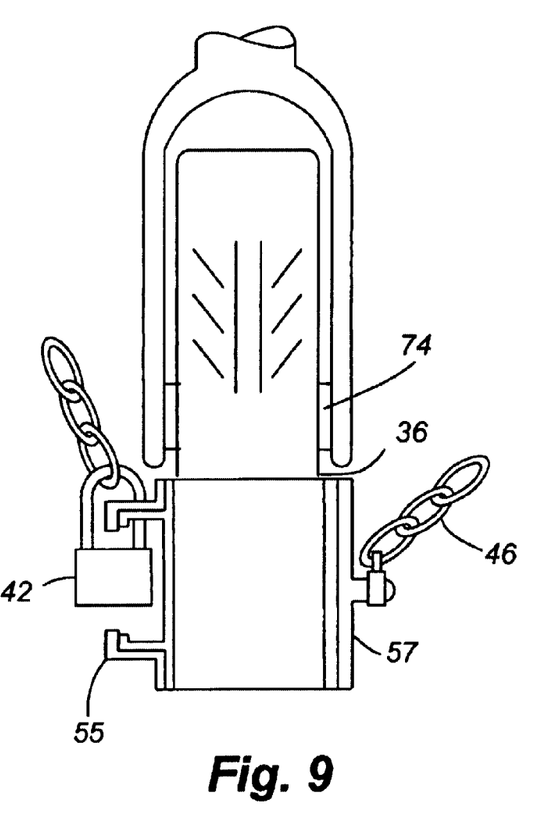
FIG. 9 is a right elevation view of the embodiment of the present invention shown in FIG. 8.

Referring now to FIGS. 8 and 9, another embodiment of the present invention is shown herein. This embodiment preferably employs a forward chock 20 and a rear chock 30. Each of the chocks 20 & 30 generally include triangularly shaped chocks that are also equipped with at least one "C" channel 55. The channels 55 are designed to selectively interconnect when the forward 20 and the rear 30 chock halves are selectively interconnected. A plate 57 interconnected to at least one chock will prevent a would-be thief from removing the apparatus by simply sliding the chock 10 transverse to the tire. Preferably, a chain 46 is interconnected to the plate 57 side of the chock 10 that is adapted to wrap around an aircraft strut 50 and interfacing with a lock 42 that is selectively interconnected to apertures in the locking channels 55.

Figure 10:
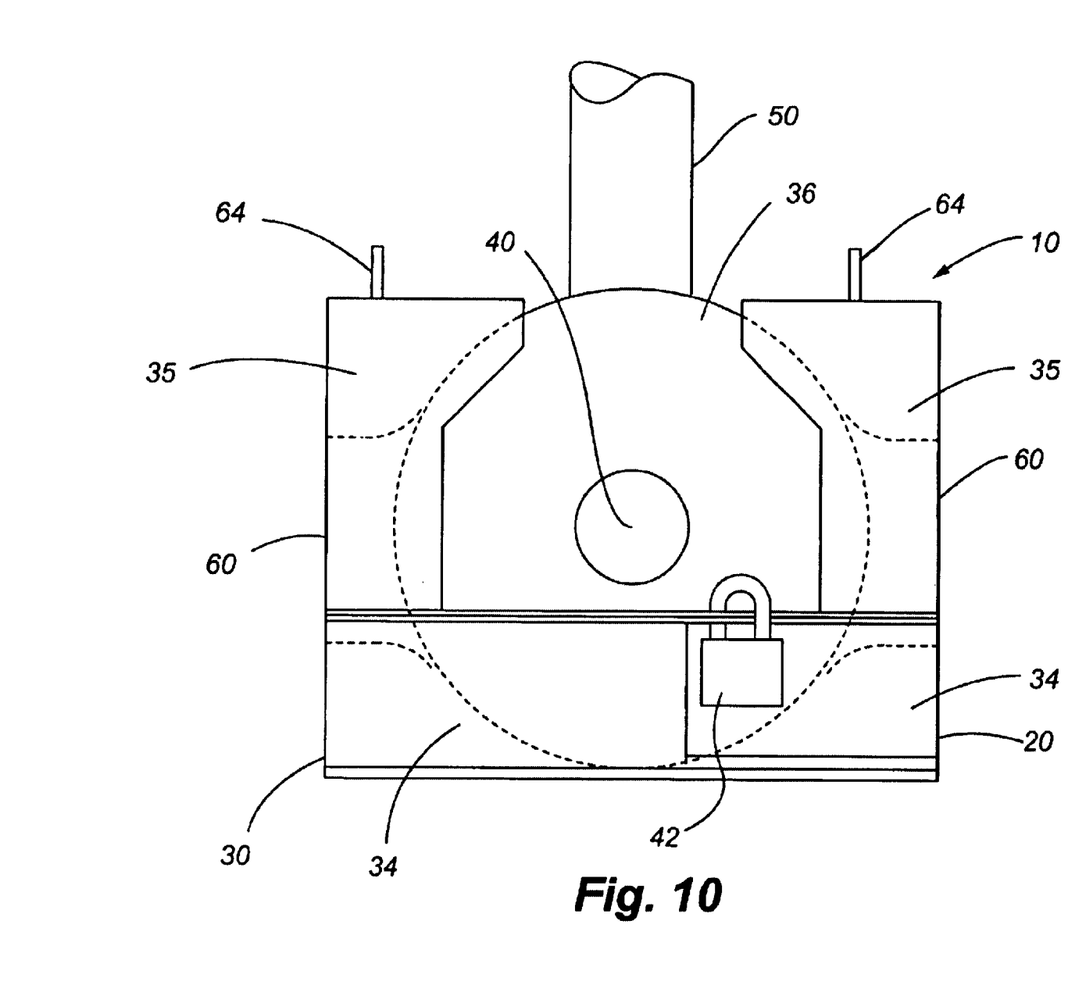
FIG. 10 is a front elevation view of yet another embodiment of the present invention, wherein the chock halves incorporate vertical extensions and thus are not necessarily required to use tethering means.

Referring now to FIG. 10, yet another embodiment of the present invention is shown, wherein the chock 10 is adapted to be used without a chain. The aforementioned chocks are preferably used in conjunction with a chain or other flexible securing means. However, it is often undesirable to use chains around aircraft. For example, most smaller planes employ exposed brakes and shocks that may be damaged if impacted by chains as the chock 10 is engaged and removed. One way to ensure aircraft security and prevent adverse effects of chains is to add vertical extensions 60 onto the forward 20 and rear 30 chocks. In one embodiment, the vertical extensions 60 employ inverted ramps 35 that abut against the tire 36 to prevent one from lifting the tire 36 out of a locked chock 10. To accommodate larger diameter tires, the extensions 60 may incorporate an adjustment means, such as a telescoping mechanism. In addition, the forward 20 and rear 30 chock halves, in one embodiment, are equipped with handles 64 to aid in installation and removal of the apparatus. Finally, one skilled in the art will appreciate that an additional "C" channel may be added near the top of this embodiment to further secure the apparatus. Alternatively, a chain may be added to interconnect the upper halves together if chain damage is not a concern.

Figure 11:
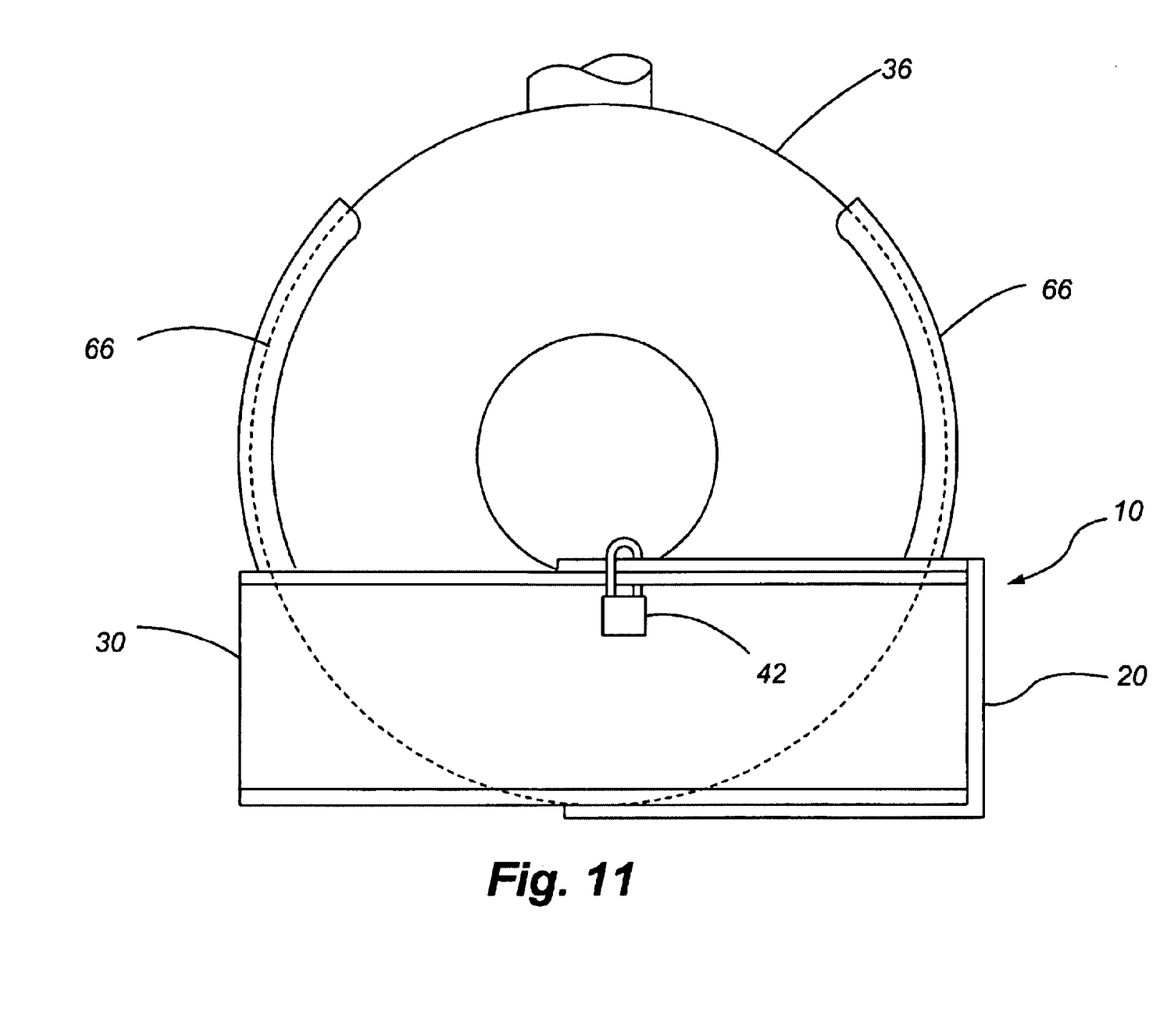
FIG. 11 is a front elevation view of still yet another embodiment of the present invention, wherein the chock halves incorporate fenders, and thus are not necessarily required to use tethering means.
Figure 12:
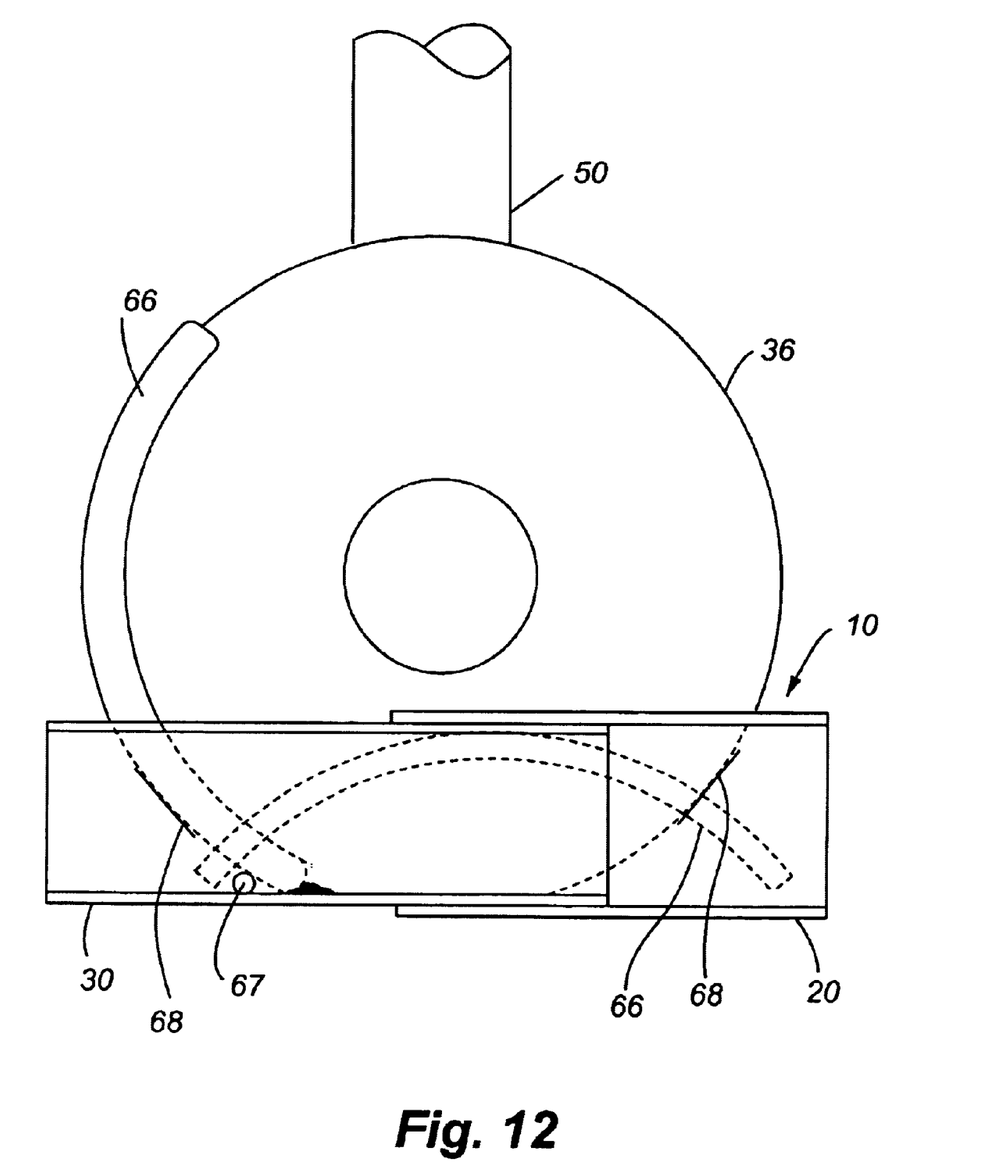
FIG. 12 is a front elevation of another embodiment of the present invention, wherein the chock halves incorporate fenders that capable of rotation in order to facilitate storage, and wherein one fender and the locking means are omitted for clarity.

Referring now to FIGS. 11–12, still yet another embodiment of the present invention is shown herein. Similar to the embodiment described in FIG. 10, this embodiment does not require a tethering means, such as a chain. The chock 10 employs fenders 66 interconnected to the forward 20 and the rear 30 chock halves. The fenders 66 are capable of fitting around a substantial portion of the tire 36, thereby preventing disengagement by simply lifting the tire 36 out of the chock 10. In addition, the fenders 66 may be equipped with side walls 68 that prevent a would-be thief from tipping the chock 10 on it's side and slipping the tire 36 out from the top portion of the chock 10 and the fenders 66. Alternatively, a chain may be added to tether the chock 10 to the aircraft 50 if chain damage is not a concern or if the aircraft 50 employs wheel covers. In another similar embodiment, the forward 20 and the rear 30 chock halves are equipped with handles or other transportation aids to facilitate installation and removal of the apparatus. In still yet another related embodiment, the fenders 66 are capable of selective interconnection to the chock halves 20 & 30. Removable fenders 66 will facilitate transportation and installation. In addition, one skilled in the art will appreciate that fenders 66, either fixed or detachable, may easily be adapted to be used with a plurality of tire 36 diameters.

Referring now to FIG. 12, another embodiment of the present invention equipped with foldable fenders 66 to facilitate storage is shown herein. In order to decrease the vertical profile of the chock 10 the fenders 66 may be hingedly interconnected to the chock halves 20 & 30. Preferably, the fenders 66 are interconnected to a rod 67 that span between the channels of the respective chock halves 20 & 30. To deploy for use, the fenders 66 are rotated around the rods 67 until they contact back rests 68 that are interconnected to the chock halves 20 & 30 between the respective channels. When not in use, the fenders 66 may be folded down within their respective chocks to decease the vertical profile of the entire assembly. The folded chock 10 will thus be adapted to more easily fit into a storage case or bag.

As mentioned above, some aircraft require a plurality of tires 36, connected via an axle 74, in order to accommodate larger payloads. One embodiment of the present invention employs a chock 10 equipped with a shortened channel that provides sufficient clearance from the axle 74. Alternatively, a chock 10 may be constructed that is adapted to encompass the plurality of tires 36.

Referring back now to FIGS. 1–12, the installation procedure of the locking chock 10 is described herein. Once an aircraft, or other wheeled vehicle is in the desired parking location, the forward chock 20 is wedged between the tire 36 of the aircraft and the parking surface. Next, the rear portion 30 is wedged behind the tire 36 and selectively interconnected with the forward chock 20. Although, as described herein, the rear chock 30 slides into the forward chock 20, one skilled in the art will appreciate that due to the symmetry of the chocks 20 and 30, the "forward" and "rear" portions may be interchanged. The extent of the telescoping interconnection between the forward 20 and the rear 30 chocks will be dictated by the diameter of the tire 36. Apertures 41 in the chock portions 20 & 30 are then aligned. Finally a lock 42 is used to securely interconnect the two portions 20 & 30 via the apertures 41. Preferably, the chocks 20 & 30 are equipped with at least two aperture patterns so that two locks are used for added security. In addition, one skilled in the art will appreciate that a locking mechanism may be integrated into the chock, which would prevent lock misplacement. Moreover, an integrated lock may be protected from theft attempts or damage within a portion of the chock. For example, automobile immobilization means such as the Denver Boot isolate and protect the locking means to prevent damage from disgruntled car owners. In one embodiment, a plastic encased chain 46 is used to tie the lock to the aircraft, or other vehicle, to prevent forceful disengagements of the locking chock 10 by lifting the tire out of the chock 10. By adding a flexible securing means, the chock 10 will still be interconnected to the aircraft after the tire is lifted from the chock. Thus, taxiing would be difficult or impossible while dragging the still-attached chock 10, for example. In a related embodiment of the invention, the flexible securing means includes at least two flexible straps or cables that are adapted to selectively interconnect to the landing gear of the aircraft. The straps also employ a plurality of apertures that are designed for selective locking interconnection to attachment locations on the chock, thereby providing a snug fit between the chock and the tire. The straps are preferably constructed of vulcanized rubber, or alternatively employ stiffening members, such as steel belts that make them difficult to cut.

Removal of a locking chock 10 would simply entail disengagement of the lock 42, removal of the chain 46, and separation of the forward 20 and the rear 30 chocks. The chock 10 is easily stowed in the aircraft, or alternatively left in a designated area at the airport for others to use.

While various embodiment of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A vehicle immobilization apparatus, comprising:
   a forward chock comprising a left channel, a right channel, and a tire contact surface, interconnected to said left channel and said right channel;
   a rear chock comprising a left channel, a right channel, and a tire contact surface, interconnected to said left channel and said right channel;
   wherein a tire of the vehicle is substantially immobilized when said left channel of said forward chock is selectively interconnected to said left channel of said rear chock, said right channel of said forward chock is selectively interconnected to said right channel of said rear chock, and said tire contact surface of said forward chock and said tire contact surface of said rear chock are engaged on the tire; and
   a locking means interconnected to at least one of said left channel of said forward chock, said left channel of said rear chock, said right channel of said forward chock, and said right channel of said rear chock, which restrains said forward chock with respect to said rear chock when they are selectively interconnected, thus preventing removal of said apparatus.

2. The vehicle immobilization apparatus of claim 1, wherein said locking means is an aperture incorporated into at least one of said left channel of said forward chock, said left channel of said rear chock, said right channel of said forward chock, and said right channel of said rear chock that is adapted to receive a pad lock.

3. The vehicle immobilization apparatus of claim 1, further comprising a second locking means, wherein said left channel of said forward chock and said left channel of said rear chock are immobilized relative to each other, and said right channel of said forward chock and said right channel of said rear chock are immobilized relative to each other when said forward chock and said rear chock are selectively interconnected.

4. The vehicle immobilization apparatus of claim 1, further comprising a flexible securing means interconnected to at least one of said forward chock and said rear chock and to the vehicle, thereby substantially preventing operation of the vehicle if said apparatus is removed from the tire.

5. The vehicle immobilization apparatus of claim 4, wherein said flexible securing means is at least one of a chain, a strap, and a cable.

6. A vehicle immobilization apparatus comprising:

a forward chock comprising a locking channel, a vertical surface, and a tire contact surface interconnected to said locking channel and said vertical surface;

a rear chock comprising a locking channel, a vertical surface, and a tire contact surface interconnected to said locking channel and said vertical surface;

wherein a tire of the vehicle is substantially immobilized when said locking channel of said forward chock is selectively interconnected to said locking channel of said rear chock, and said tire contact surface of said forward chock and said tire contact surface of said rear chock are engaged on the tire; and a locking means interconnected to said locking channel of said forward chock and to said locking channel of said rear chock, which restrains said forward chock with respect to said rear chock when they are selectively interconnected, thus preventing removal of said apparatus.

7. The vehicle immobilization apparatus of claim 6, wherein said locking means are apertures incorporated into said locking channel of said forward chock and into said locking channel of said rear chock that are adapted to receive a pad lock.

8. The vehicle immobilization apparatus of claim 6, further comprising a flexible securing means interconnected to at least one of said forward chock and said rear chock and to the vehicle.

9. The vehicle immobilization apparatus of claim 8, wherein said flexible securing means is at least one of a chain, a cable, and a strap.

10. A vehicle immobilization apparatus comprising:

a forward chock comprising a left channel, a right channel, a lower tire contact surface, interconnected to said left channel and said right channel, a left vertical extension, which is interconnected to said left channel, a right vertical extension, which is interconnected to said right channel, and an upper tire contact surface, interconnected to said left vertical extension and said right vertical extension;

a rear chock comprising a left channel, a right channel, a lower tire contact surface, interconnected to said left channel and said right channel, a left vertical extension, which is interconnected to said left channel, a right vertical extension, which is interconnected to said right channel, and an upper tire contact surface, interconnected to said left vertical extension and said right vertical extension;

wherein a tire of the vehicle is substantially immobilized when said left channel of said forward chock is selectively interconnected to said left channel of said rear chock, said right channel of said forward chock is selectively interconnected to said right channel of said rear chock, and said upper and said lower tire contact surfaces of said forward chock and said upper and said lower tire contact surfaces of said rear chock are engaged on the tire; and a locking means interconnected to at least one of said left channel of said forward chock, said left channel of said rear chock, said right channel of said forward chock, and said right channel of said rear chock, which restrains said forward chock with respect to said rear chock when they are selectively interconnected, thus preventing removal of said apparatus.

11. The vehicle immobilization apparatus of claim 10, wherein said locking means is an aperture incorporated into at least one of said left channel of said forward chock, said left channel of said rear chock, said right channel of said forward chock, and said right channel of said rear chock that is adapted to receive a pad lock.

12. The vehicle immobilization apparatus of claim 10, further comprising a second locking means, wherein said left channel of said forward chock and said left channel of said rear chock are immobilized relative to each other, and said right channel of said forward chock and said right channel of said rear chock are immobilized relative to each other when said forward chock and said rear chock are selectively interconnected.

13. The vehicle immobilization apparatus of claim 10, further comprising a flexible securing means interconnected to at least one of said forward chock and said rear chock and to the vehicle, thereby substantially preventing operation of the vehicle if said apparatus is removed from the tire.

14. The vehicle immobilization apparatus of claim 10, wherein said forward chock and said rear chock further include handles, which aid in transportation thereof.

15. A vehicle immobilization apparatus comprising:

a forward chock comprising a left channel, a right channel, and a tire contact fender operably interconnected to said first left channel and said first right channel;

a rear chock comprising a left channel, a right channel, and a tire contact fender operably interconnected to said first left channel and said first right channel;

wherein a tire of the vehicle is substantially immobilized when said left channel of said forward chock is selectively interconnected to said left channel of said rear chock, said right channel of said forward chock is selectively interconnected to said right channel of said rear chock, and said tire contact fender of said forward chock and said tire contact fender of said rear chock are engaged on the tire; and a locking means interconnected to at least one of said left channel of said forward chock, said left channel of said rear chock, said right channel of said forward chock, and said right channel of said rear chock, which restrains said forward chock with respect to said rear chock when they are selectively interconnected, thus preventing removal of said apparatus.

16. The vehicle immobilization apparatus of claim 15, wherein said locking means is an aperture incorporated into at least one of said left channel of said forward chock, said left channel of said rear chock, said right channel of said forward chock, and said right channel of said rear chock that is adapted to receive a pad lock.

17. The vehicle immobilization apparatus of claim 15, wherein said fenders include an upper edge, a lower edge, and two lateral edges therebetween, and wherein side walls are interconnected to said lateral edges which aid in the prevention of unauthorized disengagement.

18. The vehicle immobilization apparatus of claim 15, further comprising a flexible securing means interconnected to at least one of said forward chock and said rear chock and to the vehicle.

19. The vehicle immobilization apparatus of claim 15, wherein said forward chock and said rear chock further include handles, which aid in transportation thereof.

20. The vehicle mobilization apparatus of claim 18, wherein said flexible securing means is at least one of a chain, a strap, and a cable.

* * * * *